(12) United States Patent
Kratzer et al.

(10) Patent No.: US 8,366,269 B2
(45) Date of Patent: Feb. 5, 2013

(54) METHOD OF MAKING A SPECTACLE LENS

(75) Inventors: Timo Kratzer, Aalen (DE); Herbert Krug, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 84 days.

(21) Appl. No.: 13/097,864

(22) Filed: Apr. 29, 2011

(65) Prior Publication Data

US 2011/0267576 A1    Nov. 3, 2011

(30) Foreign Application Priority Data

Apr. 29, 2010   (DE) .......................... 10 2010 018 710

(51) Int. Cl.
*G02C 13/00* (2006.01)
(52) U.S. Cl. .................................................. 351/159.75
(58) Field of Classification Search . 351/159.73–159.76
See application file for complete search history.

(56) References Cited

U.S. PATENT DOCUMENTS

| | | | |
|---|---|---|---|
| 5,444,503 | A | 8/1995 | Kelch et al. |
| 6,089,713 | A | 7/2000 | Hof et al. |
| 7,677,725 | B2 | 3/2010 | Piers et al. |
| 7,918,555 | B2 | 4/2011 | Sverdrup et al. |
| 2006/0238712 | A1 | 10/2006 | Dahi et al. |
| 2007/0132945 | A1 | 6/2007 | Haser et al. |
| 2010/0157242 | A1 | 6/2010 | Esser et al. |
| 2010/0296055 | A1 | 11/2010 | Esser et al. |
| 2010/0309428 | A1 | 12/2010 | Altheimer et al. |
| 2010/0321635 | A1 | 12/2010 | Apter et al. |
| 2011/0199572 | A1 | 8/2011 | Sverdrup et al. |

OTHER PUBLICATIONS

English translation of Koeppen, Werner, "Konzeption and Entwicklung von Gleitsichtglaesern (Conception and development of progressive lenses)", in Deutsche Optiker Zeitschrift DOZ dated Oct. 1995, originally pp. 42 to 45, now pp. 1 to 10.
Office action of the German Patent and Trademark Office dated Jul. 15, 2010 of German application 10 2008 018 710.0-51 on which this application is based and an English translation thereof.
Search report of the European Patent Office dated Feb. 1, 2012 issued in the parallel European patent application No. 11163184.2 (published as EP 2383603) and English translation thereof.

*Primary Examiner* — Darryl J Collins
(74) *Attorney, Agent, or Firm* — Walter Ottesen

(57) ABSTRACT

The invention relates to a method of making a spectacle lens. The method of the invention includes the method steps of providing a prescription for the spectacle lens (200), providing a material for manufacturing the spectacle lens (300), providing at least two design wavelengths (400), providing the particular refractive indices of the material for the at least two design wavelengths (500), computing each an optical predesign for the spectacle lens having the respective determined refractive index of the material for the at least two design wavelengths in consideration of the prescription (600, 700), and computing the optical design of the spectacle lens from the optical predesign for the spectacle lens for the refractive index (800) determined from the at least two design wavelengths.

13 Claims, 4 Drawing Sheets

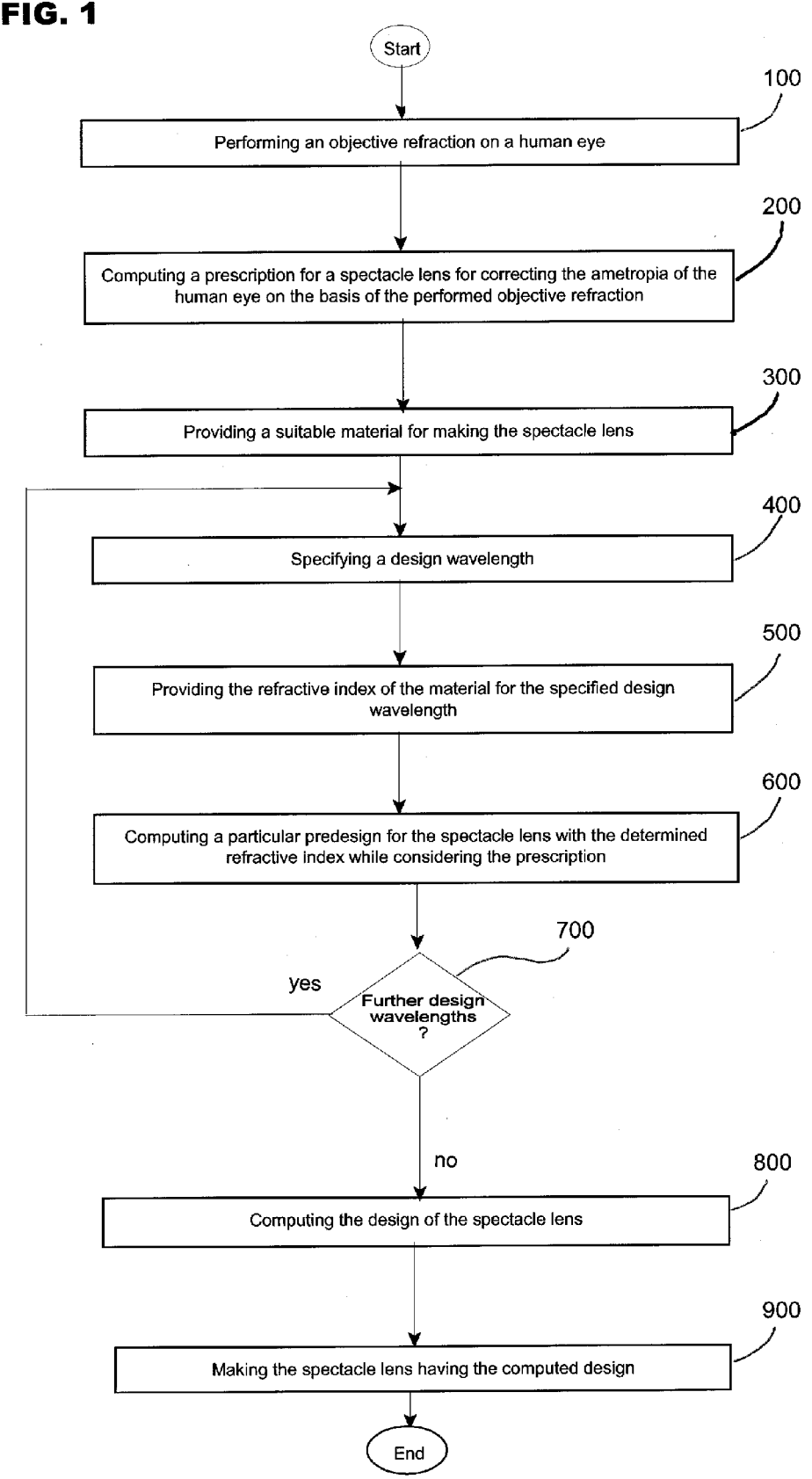

METHOD OF MAKING A SPECTACLE LENS

CROSS REFERENCE TO RELATED APPLICATION

This application claims priority of German patent application no. 10 2010 018 710.0, filed Apr. 29, 2010, the entire content of which is incorporated herein by reference.

FIELD OF THE INVENTION

The invention relates to a method of making a spectacle lens.

BACKGROUND OF THE INVENTION

Many methods are known which normally are computer-implemented methods for computing the design, that is the geometry of an optical lens having a lens front surface and a lens back surface, especially of a spectacle lens having a spectacle lens front surface and a spectacle lens back surface in order to obtain the desired imaging characteristics or to come at least very close to these desired imaging characteristics. In other words, the invention is directed to a method for computing the design of a spectacle lens in order to obtain the specific configuration of the two surfaces of the spectacle lens, namely the back surface which is adapted to be pointing in the direction of the eye of the spectacles wearer, and the spectacle lens front surface which is provided for aligning toward the object side, in order to obtain specific optical characteristics. When it comes to the specific configuration of a surface of a spectacle lens, one also speaks of the surface design of a spectacle glass, that is a spectacle lens. In very general terms, computation methods for the spectacle lens design are known which model the wave characteristics or the particle characteristics of the light. For computing the design of spectacle lenses, numerical light beam tracing methods, so-called ray-tracing algorithms, are normally used. The article entitled "Konzeption und Entwicklung von Gleitsichtgläsern" by Werner Köppen in the publication Deutsche Optiker Zeitschrift DOZ of October 1995, pages 42 to 45, gives a first impression of the complexity of such computations.

The spectacle lens geometry in all of the above-mentioned methods is computed on the basis of monochromatic light, that is a light having only one wavelength. For this wavelength, the so-called design wavelength, the index of refraction is determined for the material used for making the spectacle lens in correspondence to the material-dependent dispersion characteristics. This index of refraction will be incorporated directly into the computation method.

Virtually each spectacle glass (the term "glass" has established itself independently of the material used and its structure) is used in a polychromatic environment, however. The human eye is capable of perceiving light having wavelengths in the range of approximately 380 nm to 750 nm. The maximum of perception of the human eye is at approximately 555 nm (photopic viewing) under daylight conditions, while at night it is approximately at 510 nm (scotopic viewing). Therefore, the total viewing impression is a weighted sum of perceptions of all visible wavelengths.

A spectacle glass is therefore computed or even optimized only for a single wavelength, namely the design wavelength. For this reason, so-called chromatic aberrations are inherent in every conventional spectacle glass. Current computations of spectacle lens geometry provide no visual performance designed for polychromatic light because of the dependency of the sensitivity of the human eye on the wavelength and the ambient brightness.

The term "chromatic aberration" is derived from the Greek "chroma", i.e. color and the Latin "aberrare", i.e. to deviate. Chromatic aberrations are imaging errors of optical lenses which are caused due to the fact that light of different wavelength or color is refracted with different intensity. In the case of a converging lens, this leads to different focal lengths for different wavelengths, that is the blue component of the image is focused ahead of the red component.

It is known to correct these errors by a combination of several lenses made of materials of different dispersion. If the wavelengths deviating the most from each other, that is the primary colors red and blue, are brought together, then one speaks of an achromatic correction or an achromatic lens. If, in addition, the primary color green is brought together with the other two colors, then there is an apochromatic correction. However, this correction is only possible in very high-quality and hence very expensive optical systems. Spectacle lenses having an achromatic or apochromatic correction cannot be manufactured at low cost so that this correction is not used in general.

In digital photography, chromatic aberrations can be subsequently corrected with the aid of an electronic image processing in that the different color channels of the image are scaled differently. A correction of this kind can be realized, for example, in a so-called electroactive spectacle lens whose refractive power is locally adjustable with the aid of an electric signal. A conventional spectacle lens, however, does not provide this correction possibility.

Diffractive structures and refractive optical lenses show opposite chromatic behavior. For this reason, combinations of both components can form so-called achromatic (i.e., wavelength-independent) hybrid optics. Whereas in general the geometry of classical lenses is computed with the aid of light beam tracing methods, wavelength methods are generally used to compute diffractive structures. Spectacle lenses configured as hybrid optics are not suitable for the mass market at the present time due to their complex manufacture.

Not only spectacle lenses provided for the correction of the ametropia of the human eye exhibit inherent chromatic aberrations; also, the optically effective components of the human eye itself exhibit chromatic aberrations. That is to say, due to its variable lens, the human eye can adapt the focal length to only one wavelength of the incident light. In part, this phenomenon is directly utilized in the signal detection of the eye because the color receptors are arranged locally separate from each other on the retina in a suitable manner. Combinations of colors impinging on the human eye and having wavelengths which lie very far apart from each other are nonetheless found to be unpleasant.

U.S. Pat. No. 7,677,725 relates to the last-mentioned effect, i.e. to the correction of chromatic aberrations caused by different refractive indices of the materials in the optical components of the human eye for different wavelengths. A method is introduced of how, for example, a spectacle glass in the form of a hybrid optics of refractive optical lens with diffractive surface structure can be computed for minimizing chromatic aberrations of the human eye.

SUMMARY OF THE INVENTION

It is an object of the invention to provide a method for making a spectacle lens which takes the natural visual acuity of the human eye into account. The spectacle lens is said to be manufactured on a comparatively cost effective basis.

The method of the invention is for making a spectacle lens and includes the steps of: providing a prescription for the spectacle lens; providing a material for making the spectacle lens; providing at least two design wavelengths for monochromatic light for computing, with the aid of a numerical sight ray tracing method, a design defining the geometric shape of a spectacle lens for a prescription; computing, with the aid of a sight ray tracing method, respective predesigns, which define a preliminary geometric shape of the spectacle lens for the prescription, for the spectacle lens having a determined refractive index of the material for a corresponding one of the wavelengths; computing the design of the spectacle lens, which defines the final geometric shape of the spectacle lens provided by the prescription, from the predesigns for the spectacle lens for the refractive indices determined from corresponding ones of the wavelengths; and, forming the spectacle lens according to the design.

In the method of the invention, a prescription has to be provided, that is a prescription for the spectacle lens functioning for corrective purposes. The term "spectacle lens", or the term "spectacle glass" used as a synonym here, is to refer to an optical lens which functions to correct the ametropia of the human eye and the corrective action thereof is based exclusively on its optical refractive power. Intensity for optical effectiveness of the spectacle lens and its distribution over the surface thereof is computed on the basis of previously performed measurements of the so-called objective and/or subjective refraction. The resulting values of the refractive measurements are entered into a special spectacles prescription, which is passed on to the optician for making the glasses or which the optician himself or herself prepares with the aid of corresponding ancillary means. The spectacles prescription or the equivalent prescription generally includes for unifocal lenses the values for the spherical effect, the astigmatic effect, and its axial position as well as the prismatic effect and its base position. In addition, individual conditions for use such as interpupillary distance, corneal vertex distance, etc. can be given. In multifocal lenses, additional data are required. Especially with progressive multifocal lenses or bifocal lenses the near addition, the so-called addition, is also provided.

In a further method step, a suitable material is selected or made available for making the spectacle lens. As a material, mineral glasses as well as plastics are used. There are so-called low refractive mineral glasses such as brillenkron, bariumkron or borosilicate glass and high-refractive mineral glasses such as "heavy flint" or "barium flint". Furthermore, a distinction is made between low-refractive plastic materials such as the materials offered under the product name CR 39 or CR 330 of Pittsburgh Plate Glass and high-refractive-index plastics such as materials put on market under the product names MR6 or MR7 of Mitsui Toasu Chemicals. All these materials have more or less intensely pronounced dispersion characteristics of the refractive index for the decisive visible wavelength range so that the computation methods based on a single design wavelength for determining a spectacle lens design do not provide any results designed for polychromatic light.

Therefore, the invention provides to compute the spectacle lens design on the basis of at least two design wavelengths. Accordingly, first of all, at least two suitable design wavelengths must be provided. Wavelengths have been shown to be suitable which, in a characteristic manner, are representative of the spectral sensitivity of the human eye as well as the preferred conditions of use. If a spectacle lens is used, for example, preferably under daylight conditions, then, for example, design wavelengths in proximity of the maximum of the spectral sensitivity of the eye for photo-optical viewing are suitable. On the other hand, if the spectacle lens is only used as night spectacles or twilight spectacles, one will select design wavelengths near the maximum of the spectral sensitivity of the eye for mesopic vision or scotopic vision. As design wavelengths for video screen spectacles, e.g. values in the range between 500 nm and 650 nm are used. For all-day spectacles, one takes, for example, as design wavelengths, the wavelengths of the maximum spectral sensitivity for photopic and scotopic vision, that is 550 nm and 510 nm. It is once again made clear that also the use of more than two selected design wavelengths can be considered. In order to limit the complexity of the computation, usually less than 20 design wavelengths, in most cases, however even less than 10 design wavelengths are provided.

In a further step, the particular refractive indices of the material, which is intended and provided for making the spectacle lens are determined for at least two design wavelengths, for example, from the usually known dispersion course or by measurement. It is also possible to take the refractive indices from a data sheet.

In a subsequent step, on the basis of the particular refractive indices corresponding to the pre-given design wavelengths, an own design is computed, i.e. a corresponding geometric shape of the spectacle lens or, in other words, the particular geometric shape of the two spectacle lens surfaces for the previously given prescription. These designs or geometric models of a spectacle lens are called predesigns for each design wavelength in the context of the present description. Methods for determining a predesign are, for example, described in U.S. Pat. Nos. 6,089,713 or 5,444,503.

Each predesign can (but need not) arise from a surface or point-to-point minimization of the aberration for the future spectacle wearer.

A final design is computed from this predesign for each design wavelength. In other words, the final shape of the spectacle lens is computed from the particular preliminary geometric shape.

The final design which defines the geometry of the spectacle lens to be made for the person having defective vision can be computed, for example, via computational mean value formation of the predesign. Specifically, this can mean that mean local curvatures can be formed from the determined local curvatures of the lens surfaces of the predesign. The totality of the mean local curvatures of the lens surfaces represents the final design. A computation method of this kind is distinguished by its simplicity.

A computational mean value formation can also comprise ascertaining the sagittas of the lens surfaces. A special case of mean value formation is represented by the arithmetic averaging. For locally assigned, ascertained curvatures of the lens surfaces or sagittas of the lens surfaces of the predesigns, for example, arithmetic mean values can be computed which define the curvatures or sagittas for the manufacture of the spectacle lens provided for the person having defective vision.

When computing the design, it is possible to weight at least two of the predesigns differently. Accordingly, it is possible e.g. that the above-mentioned curvatures or sagittas of the predesign are considered with different weight in the averaging.

After the mathematical computation of the final design, these curvatures or sagittas are transferred to manufacturing parameters on the basis of which the spectacle lens will be manufactured. Instead of computing the predesign and subsequently determining the final design, one can also compute the optical characteristics at different points on a model of a spectacle lens having a given shape of front and rear surfaces, for each of the previously determined refractive indices of the material in consideration of the prescription, for example, with the aid of the ray-tracing method. and one can calculate the final design of the spectacle lens from these optical characteristics ascertained for each point for different refractive indices. In particular, it is possible, for computing the final design of the spectacle lens, to weight the optical characteristics averaged at the different points for the refractive indices determined from the at least two design wavelengths. Optical characteristics are understood to be especially spherical, astigmatic, and prismatic aberrations, aberrations of higher order as well as distortion.

These variations, too, are characterized by their simplicity.

The above methods can be present e.g. in the form of a computer program having program code means and can be stored e.g. on a data carrier. The computer program can then be started on a computer so that the respective method will be carried out.

BRIEF DESCRIPTION OF THE DRAWINGS

The invention will now be described with reference to the drawings wherein:

FIG. 1 shows a flowchart of a first embodiment of the method according to the invention;

Figure 2A:
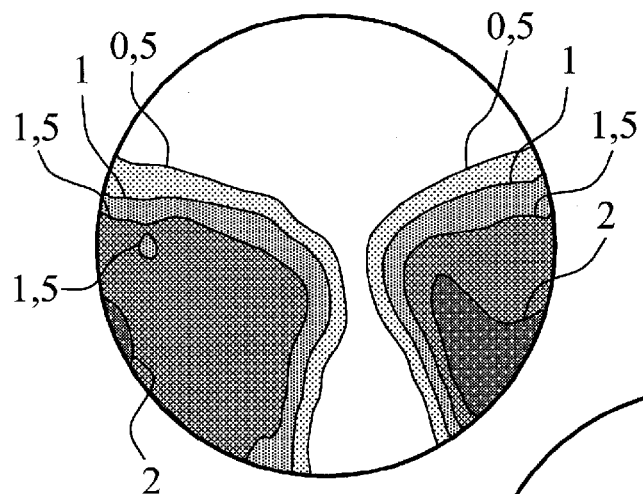
FIGS. 2a to 2f show different optical distributions of effect on a spectacle lens for different wavelengths of the incident light; and, FIG. 3 is a flowchart showing a second embodiment of the method of the invention.

DESCRIPTION OF THE PREFERRED
EMBODIMENTS OF THE INVENTION

FIG. 1 shows a flowchart of a first embodiment of a method of the invention. In a first step 100, the optometrist performs an objective refraction on the eye of a person having defective vision with the aid of an autorefractor. From the measurements carried out on the eye, the autorefractor determines prescription values for sphere (sph), cylinder (cyl), and their axial position (ax) and makes them available in the form of a prescription (step 200). By way of example, it can be assumed that these prescription values are: sph=3.25 dpt, cyl=0.75 dpt and ax=80°. The optometrist asks the customer as to his or her desired purpose of the spectacles. Here, it is assumed that the customer intends the spectacles for daily use. After conferring with the person having defective vision, the optometrist selects a suitable spectacle glass material. For the present example, it is assumed that CR 39 was selected (step 300). The prescription including the prescription values of sph=3.25 dpt, cyl=0.75 dpt and ax=80°, the material type CR 39, as well as the intended purpose "all-day spectacles" is handed over to the spectacle lens manufacturer.

The information made available by the optometrist can be entered into a computer via a corresponding input unit. On the basis of this information, the spectacle lens manufacturer determines, for example, that a suitable spectacle lens can be computed for the person having defective vision from five different design wavelengths, namely: 480 nm, 510 nm, 520 nm, 555 nm, and 610 nm. First, the design wavelength 480 nm is inputted (step 400). In a further step 500, the refractive index of CR 39 is determined for the design wavelength 480 nm. This is n=1.504. Based on the refractive index determined for the design wavelength 480 nm, a predesign is computed with the prescription values in a further step 600. The predesign contains all geometric information such as the sagittas and/or the curvature distribution over the two lens surfaces. Furthermore, the corresponding dioptric data for this wavelength, for example, the distribution of effect and the distribution of astigmatic aberration are computed over the entire lens surface. This procedure is repeated (inquiry 700) for the other design wavelengths 510 nm, 520 nm, 555 nm, and 610 nm. In accordance with this, for each design wavelength, the computer computes a complete geometric and optical model of the spectacle lens corresponding to this design wavelength.

From these predesigns, a final design is computed in step 800 in accordance with the following: First, the points relevant for the computation of the final design on the spectacle lens are determined. These points can either be placed uniformly in a rectangular lattice on the spectacle lens, they can be placed in correspondence to the path course of a later processing machine or they can be placed in correspondence to the optical characteristics of one or several predesigns. In a second step, a weighted averaging of the local curvatures for each of these points on the spectacle lens takes place. The weighting takes place on the basis of the average spectral sensitivity of the human eye such as is described e.g. in the *Handbuch für Augenoptik*, of Carl Zeiss, *Markenoptik*, newly revised by Dr. Helmut Goersch, 4th edition, C. Maurer Druck+Verlag (year 2000, p. 82). The final design provides the manufacturing parameters for manufacturing the spectacle lens intended for the person having defective vision (step 900).

FIGS. 2a to 2f show once again on the basis of an example that the optical effect or refractive distribution over the spectacle lens is dependent upon the wavelength of the light. In FIGS. 2a to 2f, distribution of optical effects of a spectacle lens of type Lantal Gradal Top of Carl Zeiss Vision GmbH is shown with the prescription values of sphere −6.0 dpt, addition 2.0 dpt. For the wavelength $\lambda_1$ of 436 nm, the refractive index $n_1$ of the lens is 1.8369, and for the wavelength $\lambda_2$=644 nm the refractive index $n_2$=1.7958.

Figure 2C:
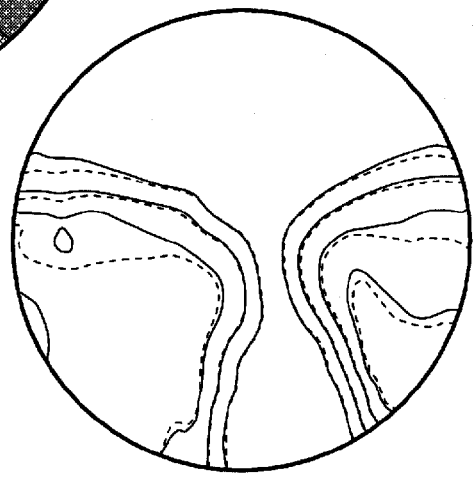
Figure 2B:
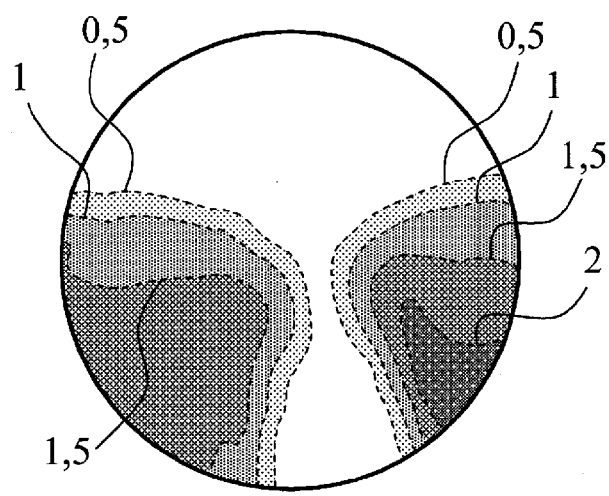
Figure 2D:
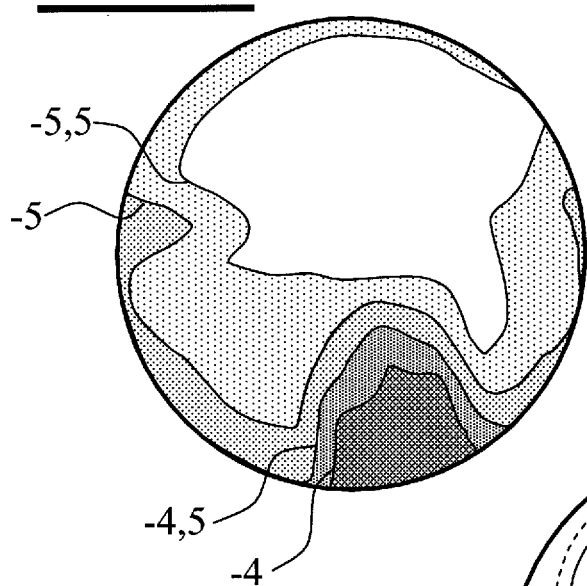
Figure 2F:
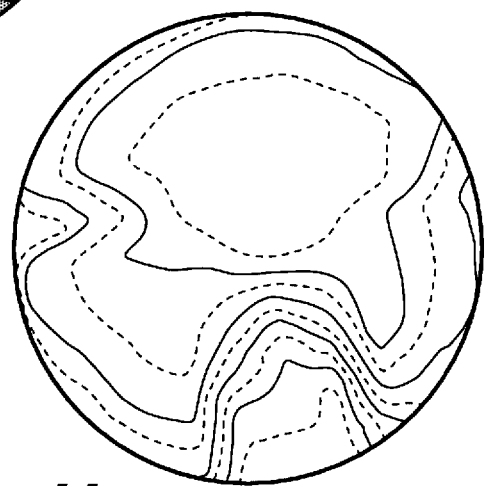
Figure 2E:
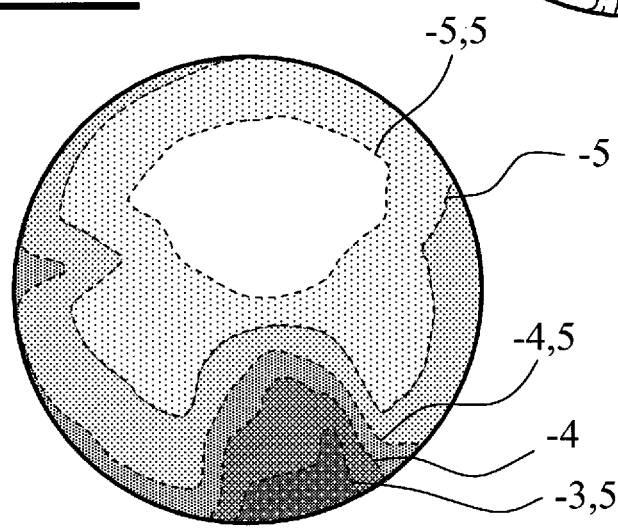

FIG. 2a shows the distribution of astigmatic effects over the lens surface for $\lambda_1$=436 nm, $n_1$=1.8369. FIG. 2b shows the distribution of astigmatic effects over the lens surface for $\lambda_2$=644 nm, $n_2$=1.7958. FIG. 2c shows the superposition of the astigmatic height profile of FIGS. 2a and 2b. FIG. 2d shows the distribution of spherical effects over the lens surface for $\lambda_1$=436 nm, $n_1$=1.8369. FIG. 2e shows the distribution of spherical effects over the lens surface for $\lambda_2$=644 nm, $n_2$=1.7958. FIG. 2f shows the superposition of the distribution of spherical effects in accordance with FIGS. 2d and 2e.

Figure 3:
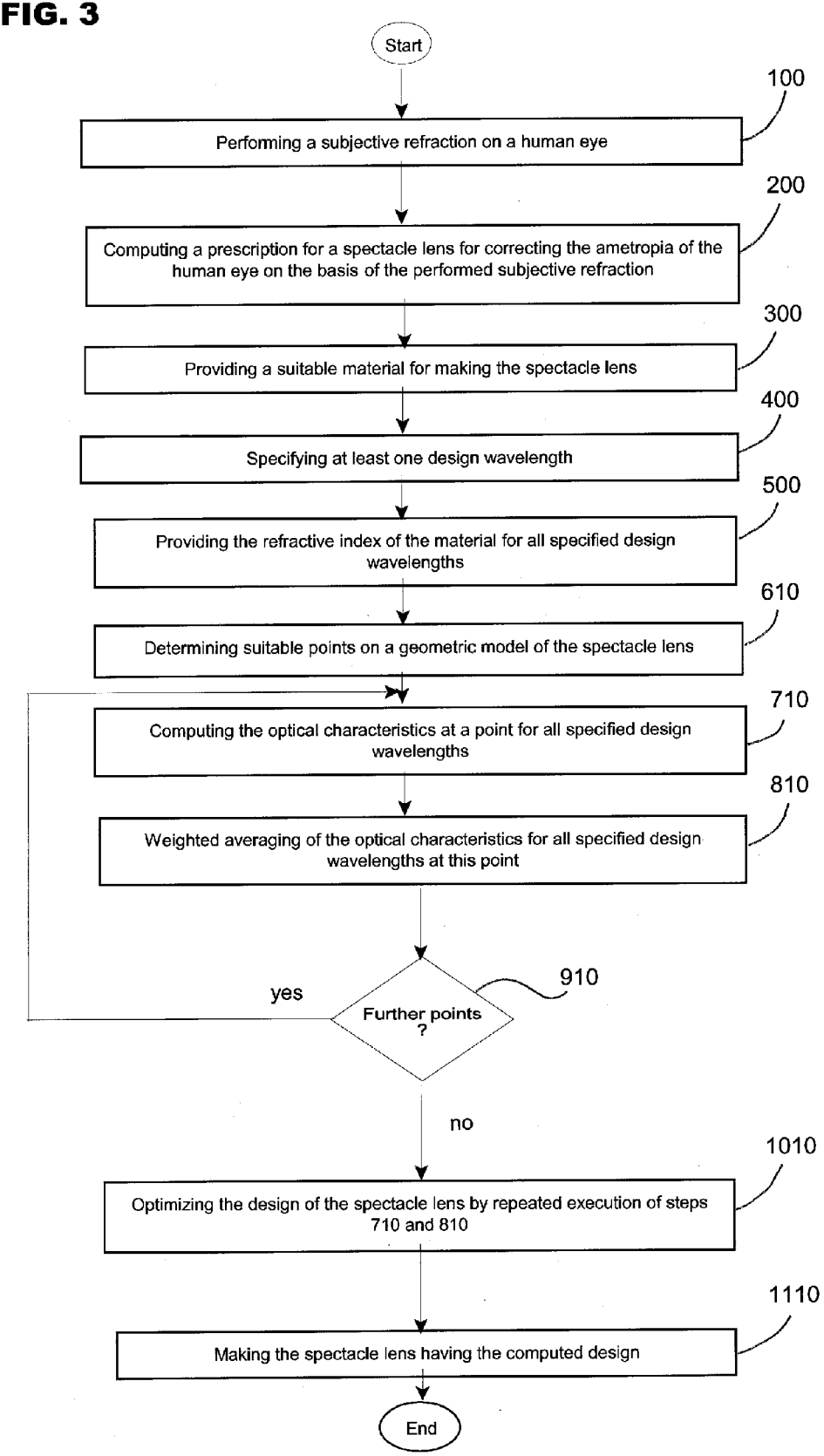

FIG. 3 shows a flowchart of a second embodiment of the method of the invention. In a first step 100, the optometrist carries out a subjective refraction on the eye of a person having defective vision. The subjective refraction supplies, as a result, prescription values for sphere (sph), cylinder (cyl), and the axial position (ax) thereof and makes them available in the form of a prescription (step 200). By way of example, it is assumed that these prescription values are: sph=3.25 dpt, cyl=0.75 dpt and ax=80°. The optometrist inquires of the customer as to his or her preferred application of use of the spectacles. Here, it is assumed that the customer intends to wear the spectacles during the night and in twilight. Upon consultation with the person having defective vision, the optometrist selects a suitable spectacle glass material. For the present example it is assumed that CR 39 is selected (step 300). The prescription having the prescription values of sph=3.25 dpt, cyl=0.75 dpt, and ax=80°, the material type CR 39, as well as the intended purpose "twilight spectacles" is communicated to the spectacle lens manufacturer. The information made available by the optometrist can be inputted via a corresponding input unit into a computer.

On the basis of the information made available by the optometrist, which information can be inputted into a computer via a suitable input means, the spectacle lens manufacturer determines, for example, that a spectacle lens can be computed which is suitable for the person having defective vision from three different design wavelengths, namely: 480 nm, 500 nm, and 520 nm (step 400). In a further step 500, the refractive index of CR 39 is determined for the selected design wavelengths.

In a further step 610, the points on the spectacle lens which are relevant for the computation of the final design are determined. These points can either be uniformly placed in a rectangular lattice on a geometric model of the spectacle lens, they can be placed in correspondence to the path course of the later processing machine or they can be placed in correspondence to the optical characteristics of one or several predesigns resulting from previous considerations or test wearing.

Based on the refractive indices determined for the different design wavelengths, the optical characteristics for each of these refractive indices are computed with the prescription values in a further step 710 at a first point on the geometric model of the spectacle lens. These optical characteristics for the different refractive indices at this point are weighted averaged in a further step 810.

For the other points, the procedure is repeated (inquiry 910). The optical characteristics can include e.g. imaging aberrations, for example, the spherical or astigmatic imaging aberrations which occur when the spectacles wearer, for whom the spectacle lens is designed, wears the spectacle lens under the conditions of use which form the basis.

In step 1010, a final design corresponding to conventional optimization methods for spectacle lenses is computed by repeatedly carrying out steps 710 to 910. An optimizing method is described, for example, in U.S. Pat. Nos. 5,444,503 and 6,089,713.

The final design provides the manufacturing parameters for the manufacture of the spectacle lens provided for the person having defective vision (1110).

For the sake of completeness, it is noted that the abovementioned design wavelengths can also be communicated to the spectacle lens manufacturer by the optometrist, based on individual sensitivities of the particular customer, instead of being determined by the spectacle lens manufacturer.

It is understood that the foregoing description is that of the preferred embodiments of the invention and that various changes and modifications may be made thereto without departing from the spirit and scope of the invention as defined in the appended claims.

What is claimed is:

1. A method of making a spectacle lens comprising the steps of:
   providing a prescription for the spectacle lens;
   providing a material for making the spectacle lens;
   providing at least two design wavelengths for monochromatic light for computing, with the aid of a numerical sight ray tracing method, a design defining the geometric shape of a spectacle lens for a prescription;
   computing, with the aid of a sight ray tracing method, respective predesigns, which define a preliminary geometric shape of the spectacle lens for said prescription, for the spectacle lens having a determined refractive index of the material for a corresponding one of said wavelengths;
   computing the design of the spectacle lens, which defines the final geometric shape of the spectacle lens provided by said prescription, from said predesigns for the spectacle lens for the refractive indices determined from corresponding ones of said wavelengths;
   computing said design by a mean value formation of said predesigns; and,
   forming the spectacle lens according to the design.

2. The method of claim 1, comprising the further step of using wavelengths of maximum sensitivity of the human eye for photopic vision and for scotopic vision as said design wavelengths.

3. The method of claim 1, comprising the further step of computing said design by an arithmetic mean value formation of said predesigns.

4. The method of claim 1, comprising the further step of differently weighting at least two of said predesigns when computing said design.

5. A data carrier having electronic out-readable control signals for coacting with a programmed computer system so that the method of claim 1 can be carried out.

6. A computer configured for carrying out the method of claim 1.

7. A computer program product comprising a computer program including program code means for carrying out a method of making a spectacle lens when said computer program is run on a computer, the method including the steps of:
   providing a prescription for the spectacle lens;
   providing a material for making the spectacle lens;
   providing at least two design wavelengths for monochromatic light for computing, with the aid of a numerical sight ray tracing method, a design defining the geometric shape of a spectacle lens for a prescription;
   computing, with the aid of a sight ray tracing method, respective predesigns, which define a preliminary geometric shape of the spectacle lens for said prescription, for the spectacle lens having a determined refractive index of the material for a corresponding one of said wavelengths;
   computing the design of the spectacle lens, which defines the final geometric shape of the spectacle lens provided by said prescription, from said predesigns for the spectacle lens for the refractive indices determined from corresponding ones of said wavelengths;
   computing said design by a mean value formation of said predesigns; and,
   forming the spectacle lens according to the design.

8. The computer program product of claim 7, wherein said computer program is stored on a non-transitory machine readable data carrier.

9. A method of making a spectacle lens comprising the steps of:
   providing a prescription for the spectacle lens;
   providing a material for making the spectacle lens;
   providing at least two design wavelengths for monochromatic light for computing, with the aid of a numerical sight ray tracing method, a design defining the geometric shape of a spectacle lens for a prescription;
   providing respective refractive indices of said material for at least two corresponding ones of said design wavelengths;
   computing, with the aid of a light ray tracing method while considering said prescription, optical characteristics at different points on a geometric model of a spectacle lens for each of the determined refractive indices of said material for said at least two design wavelengths;
   computing the design of said spectacle lens, which defines a geometric shape of the spectacle lens provided by said prescription, from said optical characteristics at said different points on said spectacle lens for said refractive indices determined from said at least two wavelengths;

weighted averaging said optical characteristics at each of said different points for refractive indices determined from said two design wavelengths; and, forming said spectacle lens according to said design.

10. A data carrier having electronic out-readable control signals for coacting with a programmed computer system so that the method of claim 9 can be carried out.

11. A computer configured for carrying out the method of claim 9.

12. A computer program product comprising a computer program including program code means for carrying out a method of making a spectacle lens when said computer program is run on a computer, the method including the steps of:

providing a prescription for the spectacle lens;

providing a material for making the spectacle lens;

providing at least two design wavelengths for monochromatic light for computing, with the aid of a numerical sight ray tracing method, a design defining the geometric shape of a spectacle lens for a prescription;

providing respective refractive indices of said material for at least two corresponding ones of said design wavelengths;

computing, with the aid of a light ray tracing method while considering said prescription, optical characteristics at different points on a geometric model of a spectacle lens for each of the determined refractive indices of said material for said at least two design wavelengths;

computing the design of said spectacle lens, which defines a geometric shape of the spectacle lens provided by said prescription, from said optical characteristics at said different points on said spectacle lens for said refractive indices determined from said at least two wavelengths;

weighted averaging said optical characteristics at each of said different points for refractive indices determined from said two design wavelengths; and, forming said spectacle lens according to said design.

13. The computer program product of claim 12, wherein said computer program is stored on a non-transitory machine readable data carrier.

* * * * *